United States Patent
Kobori et al.

(10) Patent No.: US 10,364,732 B2
(45) Date of Patent: Jul. 30, 2019

(54) VALVE DEVICE FOR EXHAUST FLOW PASSAGE

(71) Applicant: FUTABA INDUSTRIAL CO., LTD., Aichi (JP)

(72) Inventors: Kiyomichi Kobori, Aichi (JP); Munehiro Tsubosaka, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 371 days.

(21) Appl. No.: 15/114,018

(22) PCT Filed: Jan. 14, 2015

(86) PCT No.: PCT/JP2015/050790
§ 371 (c)(1),
(2) Date: Jul. 25, 2016

(87) PCT Pub. No.: WO2015/111480
PCT Pub. Date: Jul. 30, 2015

(65) Prior Publication Data
US 2016/0341096 A1     Nov. 24, 2016

(30) Foreign Application Priority Data
Jan. 23, 2014   (JP) .................................. 2014-010366

(51) Int. Cl.
*F16K 15/03*   (2006.01)
*F01N 13/08*   (2010.01)
*F01N 1/16*    (2006.01)

(52) U.S. Cl.
CPC ............. *F01N 13/08* (2013.01); *F01N 1/166* (2013.01); *F16K 15/033* (2013.01);
(Continued)

(58) Field of Classification Search
CPC ...... F01N 13/08; F01N 1/166; F01N 2260/06; F01N 2260/14; F01N 2410/00; F01N 2550/06; F16K 15/033
(Continued)

(56) References Cited

U.S. PATENT DOCUMENTS

2015/0027566 A1   1/2015  Kobori

FOREIGN PATENT DOCUMENTS

| JO | 2013174131 A | 9/2013 |
|----|--------------|--------|
| JP | H09195749 A  | 7/1997 |

(Continued)

OTHER PUBLICATIONS

International Search Report and Witten Opinion dated Mar. 10, 2015 for International Application No. PCT/JP2015/050790, filed Jan. 14, 2015.
(Continued)

*Primary Examiner* — Laert Dounis
*Assistant Examiner* — Kelsey L Stanek
(74) *Attorney, Agent, or Firm* — David D. Brush; Westman, Champlin & Koehler, P.A.

(57) ABSTRACT

A valve device for an exhaust flow passage includes a toggle mechanism, in which a support-side link member and a valve-side link member form a first stopper mechanism and a second stopper mechanism. The first stopper mechanism is configured to limit a link angle formed by the support-side link member and the valve-side link member by abutment of a first support-side stopper portion formed in the support-side link member and a first valve-side stopper portion formed in the valve-side link member against each other. The second stopper mechanism is configured to limit the link angle by abutment of a second support-side stopper
(Continued)

portion formed in the support-side link member and a second valve-side stopper portion formed in the valve-side link member.

3 Claims, 7 Drawing Sheets

(52) U.S. Cl.
CPC ...... *F01N 2260/06* (2013.01); *F01N 2260/14* (2013.01); *F01N 2410/00* (2013.01); *F01N 2550/06* (2013.01)

(58) Field of Classification Search
USPC ............................................ 60/324; 137/527
See application file for complete search history.

(56) References Cited

FOREIGN PATENT DOCUMENTS

| JP | H10141040 A | 7/1998 | |
|---|---|---|---|
| JP | H10196806 A | 7/1998 | |
| JP | WO 2013125572 A1 * | 8/2013 | ............... F01N 1/08 |
| WO | 20130125572 A1 | 8/2013 | |

OTHER PUBLICATIONS

English Translation of the International Search Report and Written Opinion dated Mar. 10, 2015 for International Application No. PCT/JP2015/050790, filed Jan. 14, 2015.

\* cited by examiner

VALVE DEVICE FOR EXHAUST FLOW PASSAGE

CROSS-REFERENCE TO RELATED APPLICATIONS

This Application is a Section 371 National Stage Application of International Application No. PCT/JP2015/050790, filed Jan. 14, 2015, and published as WO 2015/111480 on Jul. 30, 2015, not in English, which claims the benefit of Japanese Patent Application No. 2014-010366 filed Jan. 23, 2014, in the Japan Patent Office, the entire disclosures of International Application No. PCT/JP2015/050790 and Japanese Patent Application No. 2014-010366 are incorporated herein by reference.

TECHNICAL FIELD

The present invention relates to a valve device for an exhaust flow passage.

BACKGROUND ART

There is known a valve device for an exhaust flow passage, which changes a flow passage mode by opening and closing an exhaust flow passage in an exhaust system for an internal combustion engine. Patent Document 1, for example, discloses a valve device for an exhaust flow passage, which opens and closes an opening formed in a separator that divides inside of a muffler for an internal combustion engine into an upstream chamber and a downstream chamber. In this valve device for an exhaust flow passage, a valve body capable of closing the opening is supported by a support body so as to be rotationally movable; the valve body is biased by a coil spring in a valve closed direction. Thus, when a number of revolutions of the internal combustion engine is low, a pressure of exhaust gas in the upstream chamber is low, which leads to a valve closed state that is a state of the opening being closed by the valve body. As a result, exhaust noise can be reduced. In contrast, when the number of revolutions of the internal combustion engine increases, a pressure of exhaust gas in the upstream chamber becomes high, which causes the valve body to be away from the opening, resulting in a valve open state that is a state of the opening being open. As a result, pressure loss can be reduced.

However, in the configuration described in Patent Document 1, as the valve body moves towards a valve open direction, the biasing force of the coil spring becomes larger. For this reason, if the coil spring is designed to provide a larger biasing force by focusing on exhaust noise reduction in the low revolution state, an effect of reducing pressure loss in the high revolution state may be impaired. In contrast, if the coil spring is designed to have a smaller biasing force by focusing on pressure loss reduction in the high revolution state, an effect of reducing exhaust noise in the low revolution state may be impaired.

In view of the above, for example, as described in Patent Document 2, a valve device for an exhaust flow passage, which includes a toggle linkage mechanism, has been proposed. The valve device for an exhaust flow passage, which includes the toggle mechanism, comprises a support-side link member supported by a support body so as to be rotationally movable, and a valve-side link member supported by a valve body so as to be rotationally movable and coupled to a support-side link member so as to be rotationally movable with respect to each other. That is, the toggle mechanism is formed of the support body, the valve body, the support-side link member, and the valve-side link member. Therefore, in a valve closed state, as a link angle that is formed by the support-side link member and the valve-side link member is larger (i.e., closer to 180 degrees), a stronger external force is required to rotationally move the valve body towards a valve open direction. Accordingly, compared with the configuration in which the valve body is maintained in a valve closed state only with a biasing force of a biasing member (for example, the aforementioned configuration described in Patent Document 1), it is possible to increase the external force necessary to open the valve body, while reducing the biasing force of the biasing member.

In order to enhance a closed-valve maintaining force of the toggle mechanism, it is necessary to design the link angle to be larger in the valve closed state; however, when the link angle reaches 180 degrees, a malfunction may be caused in which the valve body cannot be opened normally. Thus, in the configuration described in Patent Document 2, a stopper mechanism is provided to limit the link angle to be smaller than 180 degrees upon abutment of a support-side stopper portion formed on the support-side link member against a valve-side stopper portion formed on the valve-side link member.

PRIOR ART DOCUMENTS

Patent Documents

Patent Document 1: Unexamined Japanese Patent Application Publication No. H9-195749
Patent Document 2: Unexamined Japanese Patent Application Publication No. 2013-174131

SUMMARY OF THE INVENTION

Problems to be Solved by the Invention

The link angle in the valve closed state greatly affects the opening characteristics of the valve body (and therefore, performance of the valve device) and therefore, it is preferable to maintain the link angle to be constant over a long period of use. However, in the aforementioned configuration described in Patent Document 2, as a result of deterioration over time, etc., a problem may arise in which the link angle that is limited by the stopper mechanism may greatly vary.

In one aspect of the present invention, it is desired to provide a valve device for an exhaust flow passage, which can inhibit variations in the link angle that is limited by the stopper mechanism.

Means for Solving the Problems

One aspect of the present invention is a valve device for an exhaust flow passage, which comprises a toggle mechanism; the valve device comprises a support body, a valve body, a support-side link member, a valve-side link member, and a biasing member. The valve body is supported by the support body so as to be rotationally movable and is configured to open and close the exhaust flow passage. The support-side link member is supported by the support body so as to be rotationally movable. The valve-side link member is supported by the valve body so as to be rotationally movable and is coupled to the support-side link member so as to be rotationally movable to each other. The biasing member is configured to bias the valve body in a valve closed direction. The support-side link member and the valve-side link member form a first stopper mechanism and a second stopper mechanism. The first stopper mechanism is configured to limit a link angle formed by the support-side link member and the valve-side link member, by abutment of a first support-side stopper portion formed in the support-side link member and a first valve-side stopper portion formed in the valve-side link member against each other. The second stopper mechanism is configured to limit the link angle by abutment of a second support-side stopper portion formed in the support-side link member and a second valve-side stopper portion formed in the valve-side link member against each other. With the above-described configuration, variations in the link angle that is limited by the stopper mechanisms can be inhibited, compared with a configuration in which the link angle is limited by one stopper mechanism only.

In the aforementioned configuration, the second support-side stopper portion may be provided at a position at which the second support-side stopper portion restricts a rotational movement of the valve-side link member; the rotational movement is performed about an abutment point of the first support-side stopper portion and the first valve-side stopper portion, which serves as a fulcrum, and the rotational movement is performed in a direction of increasing the link angle. This configuration enables to effectively inhibit variations of the link angle.

In the aforementioned configuration, the first support-side stopper portion and the second support-side stopper portion may abut against the valve-side link member in a state that allows expansion and contraction of the valve-side link member due to heat expansion, and the first valve-side stopper portion and the second valve-side stopper portion may abut against the support-side link member in a state that allows extraction and contraction of the support-side link member due to heat expansion. With this configuration, a malfunction, etc., which may be caused because of inhibition of expansion and contraction due to heat expansion, can be made less likely to occur.

EXPLANATION OF REFERENCE NUMERALS

1 . . . valve device, 2 . . . support body, 3 . . . valve body, 4 . . . support-side link member, 5 . . . valve-side link member, 7 . . . biasing member, 8 . . . mesh member, 61 . . . first rotation axis member, 62 . . . second rotation axis member, 63 . . . third rotation axis member, 64 . . . fourth rotation axis member, 413 . . . claw part, 421 . . . protruding portion, 513 . . . tip end, 514 . . . upper edge part.

MODE FOR CARRYING OUT THE INVENTION

Hereinafter, embodiments to which the present invention is applied will be described with reference to the drawings.

1. Configuration

Figure 1:
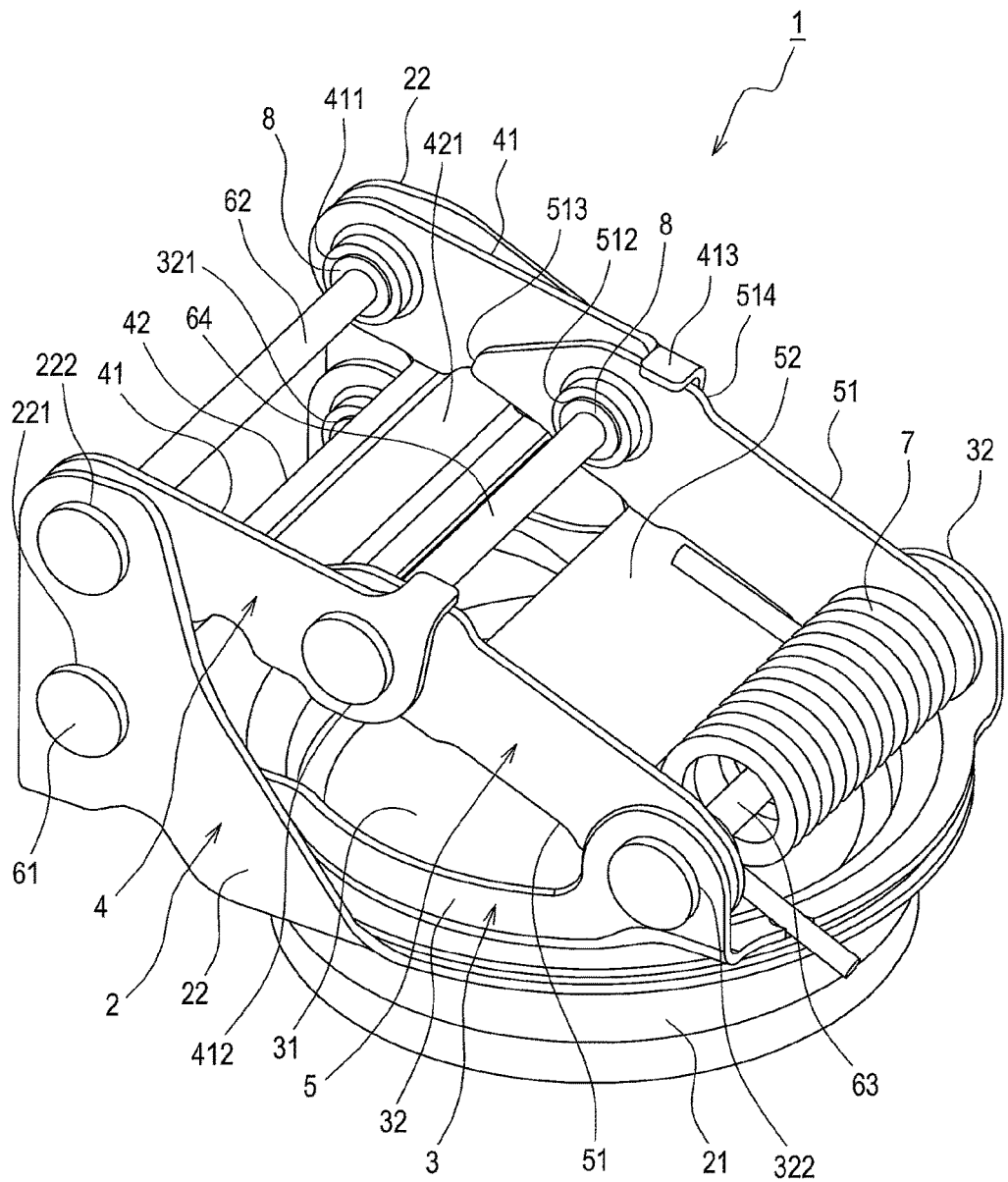
FIG. 1 is a perspective view of a valve device for an exhaust flow passage of an embodiment.

A valve device for an exhaust flow passage (hereinafter, simply referred to as "valve device") 1 shown in FIG. 1 is provided in an exhaust flow passage for exhaust gas that is discharged from an internal combustion engine mounted on a vehicle. As in the aforementioned configuration described in Patent Document 2, the valve device 1 of the present embodiment is provided inside a muffler, which is not shown, that forms a part of the exhaust flow passage; the valve device 1 is attached to a downstream-side end portion of an inner pipe that communicates a plurality of chambers formed in the muffler; and the valve device 1 opens and closes an opening of the aforementioned end portion (i.e., a bypass flow channel for exhaust gas).

Figure 2A:
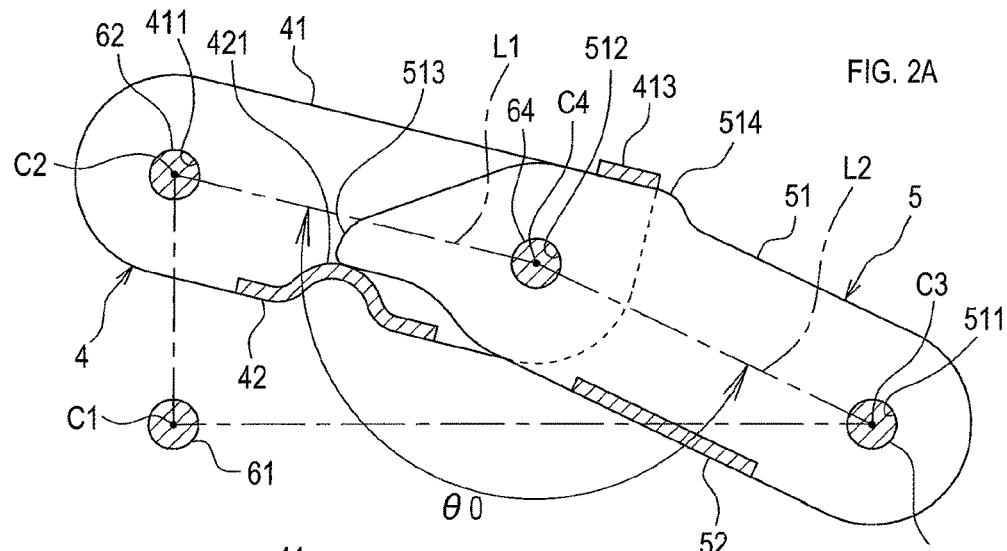
FIG. 2A is a schematic cross-sectional view showing a coupled state of a support-side link member and a valve-side link member of the embodiment, in which a backlash between the support-side link member and the valve-side link member is small.

As shown in FIGS. 1 and 2A, the valve device 1 comprises a support body (stay) 2, a valve body (butterfly) 3, a support-side link member 4, a valve-side link member 5, four rotation axis members 61 to 64, and a biasing member 7.

The support body 2 comprises a body part 21 of a generally annular shape and two side plate parts 22; the two side plate parts 22 are raised respectively from left and right sides of the body part and are symmetrical to each other. The body part 21 is fixed to the opening of the downstream-side end portion of the inner pipe. In the body part 21, a communication hole for communicating with the opening of the inner pipe is formed at a position at which this opening is covered by the valve body 3. In the side plate part 22, a first bearing part 221 and a second bearing part 222 are formed; through the first bearing part 221, the first rotation axis member 61 for rotationally and movably supporting the valve body 3 penetrates; and through the second bearing part 222, the second rotation axis member 62 for rotationally and movably supporting the support-side link member 4 penetrates.

The valve body 3 comprises a body part 31 having a generally annular shape and two side plate parts 32; the two side plate parts 32 are raised respectively from left and right sides of the body part and are symmetrical to each other. The body part 31 is formed in a shape capable of closing the opening of the inner pipe (specifically, the communication hole formed in the body part 21 of the support body 2). A first bearing part 321, through which the aforementioned first rotation axis member 61 penetrates, is formed in a base-side end portion of the side plate part 32. That is, the valve body 3 is coupled to the support body 2 via the first rotation axis member 61, and is supported by the support body 2 so as to be rotationally movable about a rotation axis (hereinafter, referred to as "the first rotation axis C1") of the first rotation axis member 61. The valve body 3 is rotationally movable from a valve closed state in which the opening of the inner pipe is closed, to a valve open state in which the opening of the inner pipe is open. Also, a third bearing part 322, through which the third rotation axis member 63 for rotationally and movably supporting the valve-side link member 5, is formed in a tip-side end portion of the side plate part 32.

The support-side link member 4 comprises two side plate parts 41 formed on both sides in its rotationally axial direction and formed to be symmetrical to each other, and a coupling plate part 42 that couples these side plate parts 41 to each other. Formed in one (the first end) of both ends of the side plate part 41 is a second bearing part 411, through which the aforementioned second rotation axis member 62 penetrates. That is, the support-side link member 4 is coupled to the support body 2 via the second rotation axis member 62, and is supported by the support body 2 so as to be rotationally movable about a rotation axis (hereinafter, referred to as "the second rotation axis C2") of the second rotation axis member 62. Moreover, formed in the other (the second end) of both ends of the side plate parts 41 is a fourth bearing part 412, through which the fourth rotation axis member 64 for rotationally and movably supporting the valve-side link member 5 penetrates. In the coupling plate part 42, a protruding portion 421 is formed; the protruding portion 421 projects upward along an axial direction of the second rotation axis member 62 (i.e., towards a direction opposite to the valve body 3).

The valve-side link member 5 comprises two side plate parts 51 formed on both sides in its rotationally axial direction and formed to be symmetrical to each other, and a coupling plate part 52 that couples these side plate parts 51 to each other. Formed in one (the first end) of both ends of the side plate part 51 is a third bearing part 511, through which the aforementioned third rotation axis member 63 penetrates. That is, the valve-side link member 5 is coupled to the valve body 3 via the third rotation axis member 63, and is supported by the valve body 3 so as to be rotationally movable about a rotation axis (hereinafter, referred to as "the third rotation axis C3") of the third rotation axis member 63. Moreover, formed in the other (the second end) of both ends of the side plate parts 51 is a fourth bearing part 512, through which the fourth rotation axis member 64 for rotationally and movably supporting the support-side link member 4 penetrates. That is, the support-side link member 4 and the valve-side link member 5 are coupled to each other via the fourth rotation axis member 64, so to be rotationally movable about a rotation axis (hereinafter, referred to as "the fourth rotation axis C4") of the fourth rotation axis member 64. The two side plate parts 51 of the valve-side link member 5 are located inward from the two side plate parts 41 of the support-side link member 4. Here, respective axial directions of the first rotation axis C1, the second rotation axis C2, the third rotation axis C3, and the fourth rotation axis C4 are parallel to one another.

As described above, the support body 2, the valve body 3, the support-side link member 4, and the valve-side link member 5 are rotatably and movably coupled to one another via the four rotation axis members 61 to 64, thereby forming a toggle linkage mechanism (link mechanism).

The biasing member (in the present embodiment, a coil spring) 7, into which the third rotation axis member 63 has been inserted, is mounted so as to act on the valve body 3 and the valve-side link member 5. The biasing member 7 is configured to bias the valve body 3 and the valve-side link member 5 in a direction approaching a positional relationship (an angle) when the valve is closed. In other words, the biasing member 7 biases the valve body 3 in a valve closed direction. Accordingly, in a state where no external force for opening the valve body 3 is applied, the valve body 3 is in a valve closed state.

As shown in FIG. 2A, in a valve closed state, a link angle that is an angle formed by the support-side link member 4 and the valve-side link member 5 is designed to be an angle θ0 that is close to 180 degrees. In other words, in the valve closed state, the support-side link member 4 and the valve-side link member 5 are designed to be generally aligned in a straight line. Specifically, in a plane orthogonal to an axial line of the first rotation axis C1, the link angle is formed by a first link line L1 connecting the second rotation axis C2 (specifically, an intersection point of the axial line and the plane; the same applies to descriptions hereinafter) to the fourth rotation axis C4, and a second link line L2 connecting the third rotation axis C3 to the fourth rotation axis C4; in the valve closed state, this link angle is an angle θ0 close to 180 degrees. The link angle is designed to become smaller, as the valve body 3 rotationally moves towards a valve open direction; thus, in the valve closed state, the link angle is formed to have the largest angle. For this reason, in the valve closed state, a strong external force is required to rotationally move the valve body 3 towards the valve open direction.

In this regard, because the valve device 1 of this type is used under a high temperature environment, it is necessary to provide a play (gap) between the axis and the bearing part, which allows expansion and contraction of each member due to thermal expansion. Specifically, plays are provided between the four rotation axis members 61 to 64, and the respective bearing parts 221, 222, 321, 322, 411, 412, 511, 512 through which these members 61 to 64 penetrate. Moreover, provided in an area of the play is a mesh member (wire mesh) 8 that is a member composed of a metallic (e.g., stainless) wire material formed in a cylindrical shape. The mesh member 8 has heat resistance and elasticity and therefore, the support body 2, the valve body 3, the support-side link member 4, and the valve-side link member 5 are coupled in a state producing little backlash.

However, if the mesh member 8 deteriorates due to a long period of use, the backlash may become greater. The greater backlash in the coupled state of the support-side link member 4 and the valve-side link member 5 causes variations of the link angle that is limited by the stopper mechanism.

In view of the above, in the present embodiment, the support-side link member 4 and the valve-side link member 5 form two stopper mechanisms that limit the link angle to be smaller than 180 degrees. The first stopper mechanism limits the link angle by abutment of the protruding portion 421 (which corresponds to a first support-side stopper portion) of the support-side link member 4 against a tip end 513 (which corresponds to a first valve-side stopper portion) of the side plate part 51 of the valve-side link member 5. The second stopper mechanism limits the link angle by abutment of a claw part 413 formed in the side plate part 41 of the support-side link member 4 (which corresponds to a second support-side stopper portion) against an upper edge part 514 (which corresponds to a second valve-side stopper portion) in the side plate part 51 of the valve-side link member 5.

The protruding portion 421 and the claw part 413 are designed to abut against the valve-side link member 5 in a state that allows expansion and contraction of the valve-side link member 5 due to heat expansion. Specifically, although the aforementioned expansion and contraction can be easily inhibited when the protruding portion 421 and the claw part 413 abut against the valve-side link member 5 on a plane approximately perpendicular to a direction of the second link line L2, the protruding portion 421 and the claw part 413 abut against the valve-side link member 5 in a plane approximately parallel to a direction of the second link line L2.

Likewise, the tip end 513 and the upper edge part 514 are designed to abut against the support-side link member 4 in a state that allows expansion and contraction of the support-side link member 4 due to heat expansion. Specifically, although the aforementioned expansion and contraction can be easily inhibited when the tip end 513 and the upper edge part 514 abut against the support-side link member 4 in a plane approximately perpendicular to a direction of the first link line L1, the tip end 513 and the upper edge part 514 abut against the support-side link member 4 in a plane approximately parallel to a direction of the first link line L1.

Moreover, the claw part 413 is provided at a position, at which when a center position of a rotational movement of the valve-side link member 5 with respect to the support-side link member 4 varies, the claw part 413 restricts the rotational movement of the valve-side link member 5 in a direction of increasing the link angle, in which the rotational movement is performed about an abutment point of the protruding portion 421 and the tip end 513, serving as a fulcrum. In other words, the tip end 513 is provided at a position at which, when a center position of a rotational movement of the support-side link member 4 with respect to the valve-side link member 5 varies, the tip end 513 restricts the rotational movement of the support-side link member 4 in a direction of increasing the link angle, in which the rotational movement is performed about an abutment point of the claw part 413 and the upper edge part 514, serving as a fulcrum.

2. Effect

According to the embodiment described in detail above, the following effects can be obtained.

[2A] The support-side link member 4 and the valve-side link member 5 form the first stopper mechanism and the second stopper mechanism; the first stopper mechanism limits the link angle by abutment of the protruding portion 421 formed in the support-side link member 4 against the tip end 513 formed in the valve-side link member 5; and the second stopper mechanism limits the link angle by abutment of the claw part 413 formed in the support-side link member 4 against the upper edge part 514 formed in the valve-side link member 5. Accordingly, the present embodiment enables to inhibit variations of the link angle that is limited by the stopper mechanisms, compared with a conventional configuration in which a link angle is limited by one stopper mechanism only.

Figure 3A:
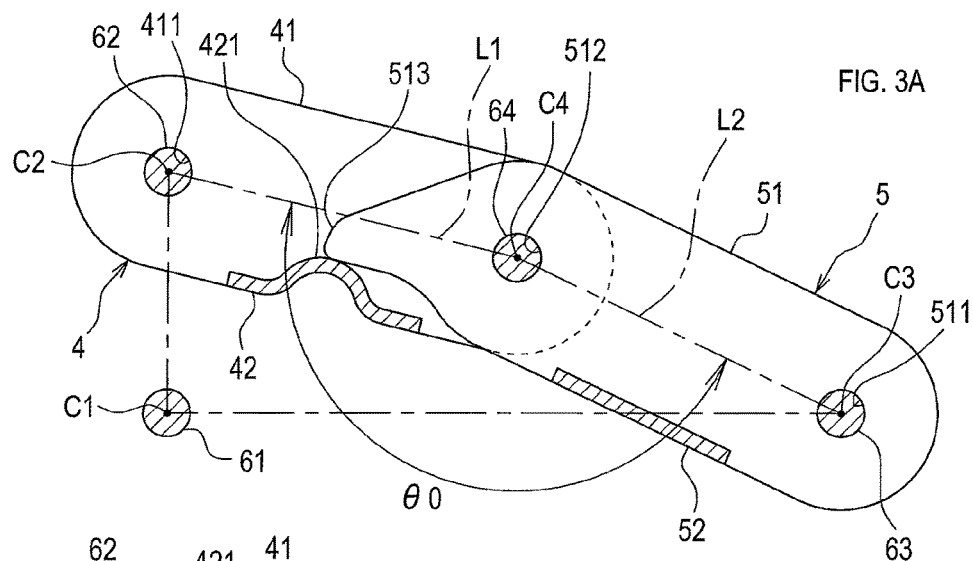
FIG. 3A is a schematic cross-sectional view showing a coupled state of a support-side link member and a valve-side link member of a comparative example, in which a backlash between the support-side link member and the valve-side link member is small.
Figure 3B:
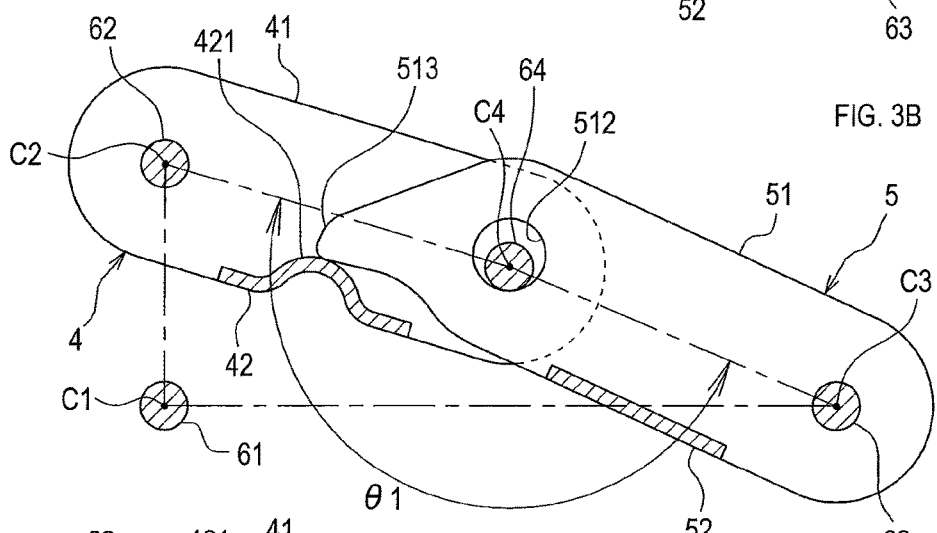
FIG. 3B is a schematic cross-sectional view showing a coupled state of the support-side link member and the valve-side link member of the comparative example, in which the backlash between the support-side link member and the valve-side link member is large and a link angle is increased.
Figure 3C:
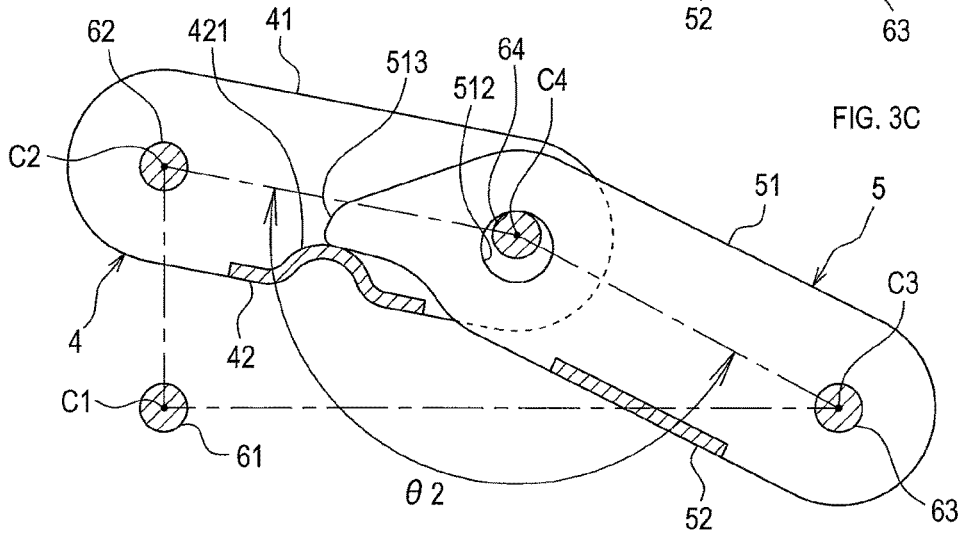
FIG. 3C is a schematic cross-sectional view showing a coupled state of the support-side link member and the valve-side link member of the comparative example, in which the backlash between the support-side link member and the valve-side link member is large and the link angle is reduced.

FIG. 3A shows a comparative example of a configuration in which only one stopper mechanism is provided; this comparative example is different from the present embodiment as not being provided with the second stopper mechanism (the claw part 413 and the upper edge part 514). In the configuration of the comparative example, if there is greater backlash in the coupled state of the support-side link member 4 and the valve-side link member 5, the link angle that is limited by the stopper mechanism varies greatly. Specifically, the link angle becomes greater than the angle θ0 in an initial state (θ1>θ0) as shown in FIG. 3B, or the link angle becomes smaller than the angle θ0 in the initial state (θ2<θ0) as shown in FIG. 3C. This is because, in a state where a center position of the rotational movement of the valve-side link member 5 with respect to the support-side link member 4 varies, the valve-side link member 5 is swingable about an abutment point of the protruding portion 421 and the tip end 513, which serves as a fulcrum.

Figure 2B:
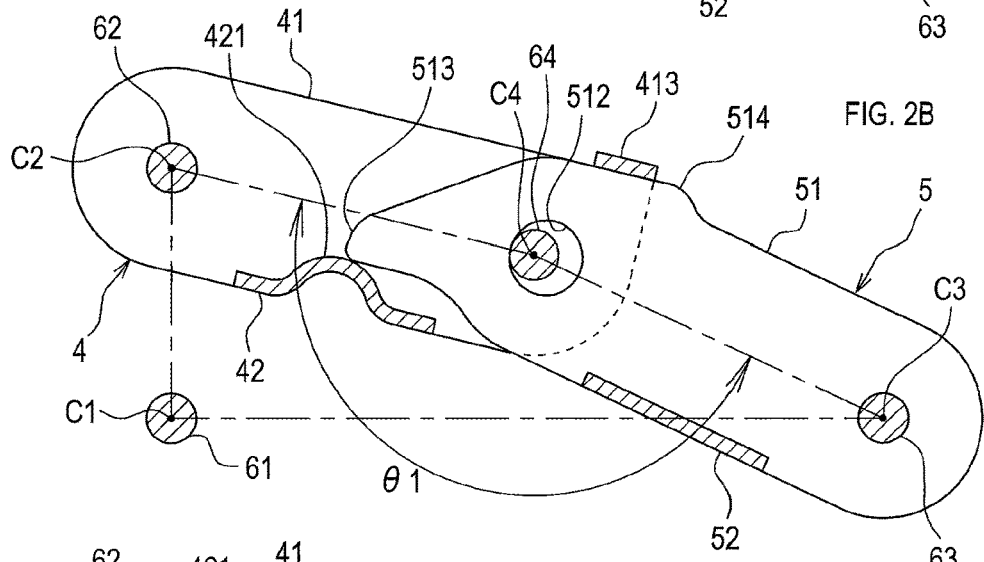
FIG. 2B is a schematic cross-sectional view showing a coupled state of the support-side link member and the valve-side link member of the embodiment, in which the backlash between the support-side link member and the valve-side link member is large and a link angle is increased.
Figure 2C:
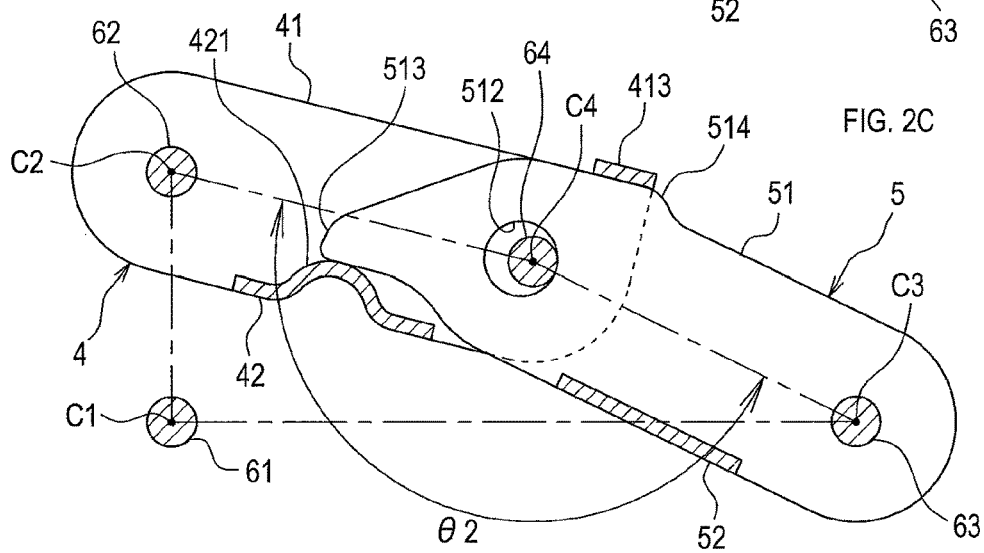
FIG. 2C is a schematic cross-sectional view showing a coupled state of the support-side link member and the valve-side link member of the embodiment, in which the backlash between the support-side link member and the valve-side link member is large and the link angle is reduced.

In contrast, in the configuration of the present embodiment, the claw part 413 is provided at a position at which, when a center position of the rotational movement of the valve-side link member 5 with respect to the support-side link member 4 varies, the claw part 413 restricts the rotational movement of the valve-side link member 5 in a direction of increasing the link angle, in which the rotational movement is performed about the abutment point of the protruding portion 421 and the tip end 513, serving as a fulcrum. That is, the valve-side link member 5 is located between the protruding portion 421 and the claw part 413. Consequently, as shown in FIGS. 2B and 2C, variations of the link angle can be inhibited, compared with the configuration of the comparative example.

Figure 4B:
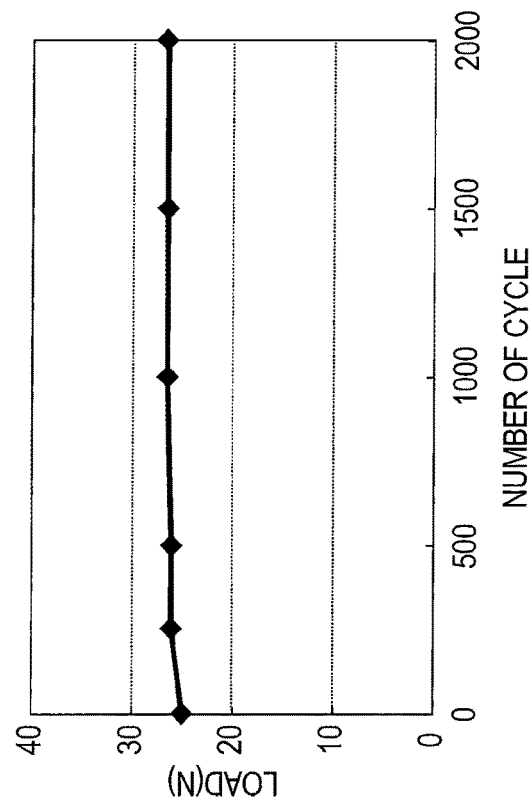
FIG. 4B is a graph showing a relationship between a number of opening-and-closing cycles of a valve body and a load when the valve body is open in a configuration of the embodiment.
Figure 4A:
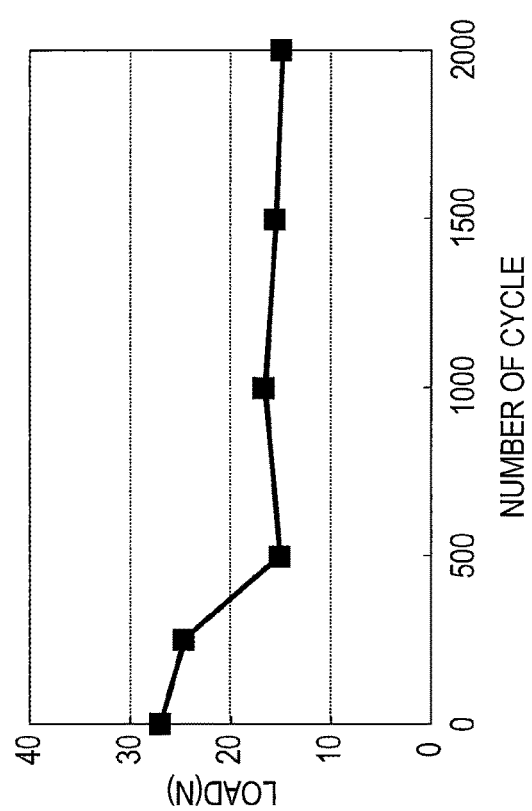
FIG. 4A is a graph showing a relationship between a number of opening-and-closing cycles of a valve body and a load when the valve body is open in a configuration according to the comparative example.
Figure 5A:
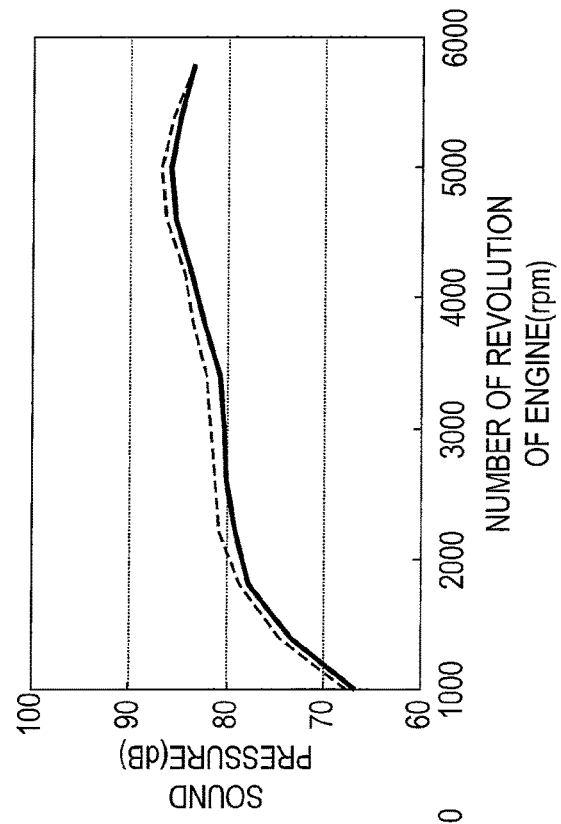
FIG. 5A is a graph showing a relationship between a number of revolutions of an engine and a sound pressure in the configuration of the comparative example.

As shown in the durability test data of FIG. 4A, in the configuration of the comparative example, a load for rotationally moving the valve body 3 from the valve closed state in the valve open direction significantly changes (in the present example, decreases) over a long period of use. For this reason, as shown in the durability test data of FIG. 5A, a sound pressure of exhaust noise in relation to a number of revolutions of an engine significantly changes (degrades) from before the durability test (shown in a solid line) to after the durability test (shown in a broken line).

Figure 5B:
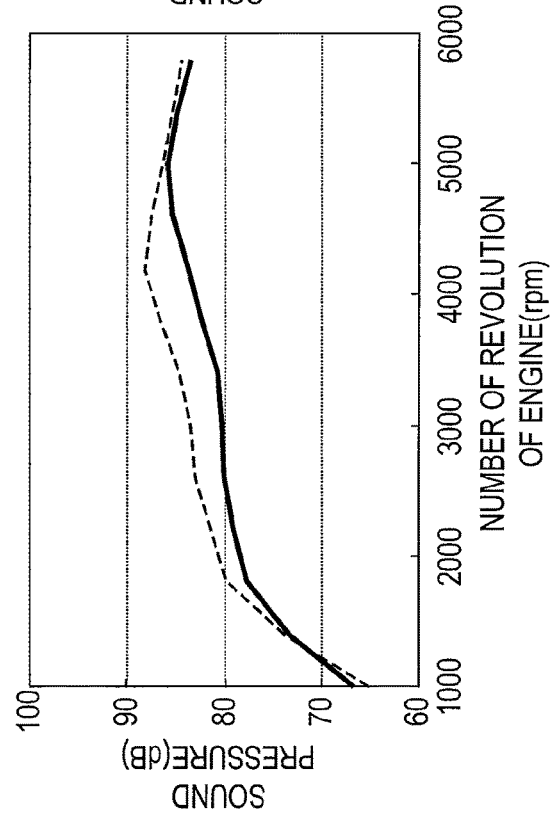
FIG. 5B is a graph showing a relationship between a number of revolutions of an engine and a sound pressure in the configuration of the embodiment.

In contrast, as shown in the durability test data of FIG. 4B, the configuration of the present embodiment enables to inhibit the load from changing even when used over a long period of time, compared with the comparative example. Thus, as shown in the durability test data of FIG. 5B, it is possible to inhibit degradation of a sound pressure of exhaust noise associated with a number of revolutions of an engine.

[2B] The claw part 413 is provided at a position at which, when a center position of the rotational movement of the valve-side link member 5 with respect to the support-side link member 4 varies, the claw part 413 restricts the rotational movement of the valve-side link member 5 in a direction of increasing the link angle, in which the rotational movement is performed about the abutment point of the protruding portion 421 and the tip end 513, serving as a fulcrum. Thus, according to the present embodiment, variations of the link angle can be effectively inhibited.

[2C] The protruding portion 421 and the claw part 413 abut against the valve-side link member 5 in a state that allows expansion and contraction of the valve-side link member 5 due to heat expansion; also, the tip end 513 and the upper edge part 514 abut against the support-side link member 4 in a state that allows expansion and contraction of the support-side link member 4 due to heat expansion. Thus, according to the present embodiment, malfunctions, etc. caused by inhibition of the expansion and contraction due to heat expansion can be made less likely to occur.

3. Other Embodiments

Although the embodiment of the present invention has been described above, it is needless to say that the present invention should not be limited to the aforementioned embodiment, but can be practiced in various forms.

[3A] The positions, structures, etc. of the first stopper mechanism and the second stopper mechanism in the aforementioned embodiment is one example, and should not be limited to this embodiment.

Figure 6A:
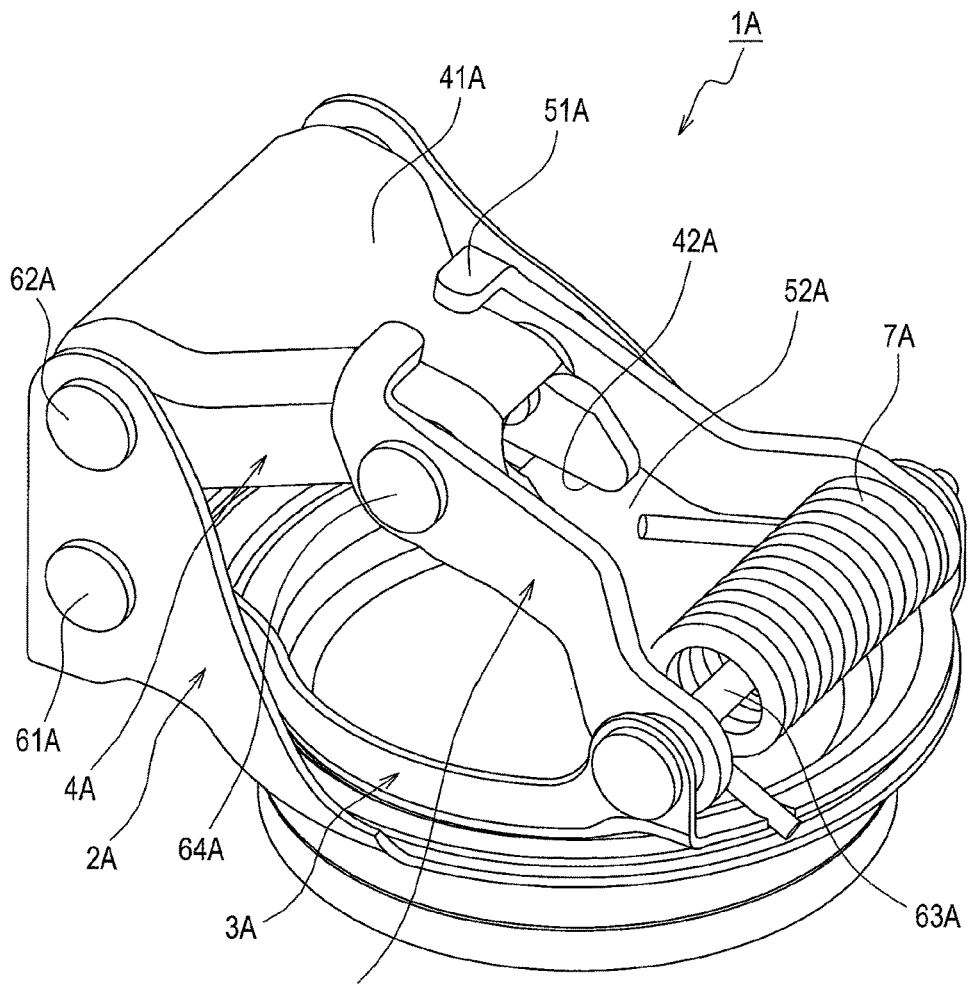
FIG. 6A is a perspective view of a valve device for an exhaust flow passage in a first modified example.
Figure 6B:
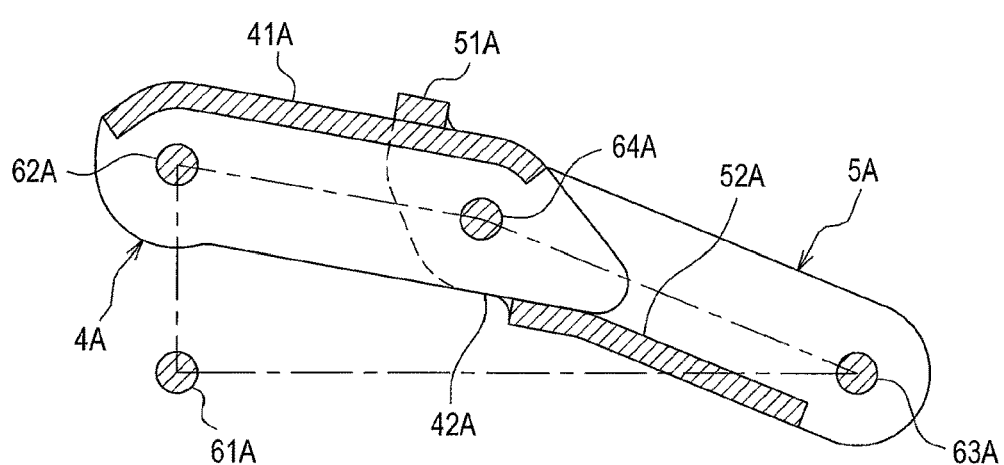
FIG. 6B is a schematic cross-sectional view showing a coupled state of a support-side link member and a valve-side link member in the first modified example.

For example, a valve device 1A of a first modified example shown in FIGS. 6A and 6B comprises a support body 2A and a valve body 3A as in the aforementioned embodiment, and comprises a support-side link member 4A and a valve-side link member 5A, each of which has a greatly different shape from the aforementioned embodiment. Also, the valve device 1A comprises four rotation axis members 61A to 64A and a biasing member 7A, as in the aforementioned embodiment.

As in the aforementioned embodiment, in the valve device 1A, the support-side link member 4A and the valve-side link member 5A form two stopper mechanisms. The first stopper mechanism is configured to limit the link angle by abutment of a top surface 41A (which corresponds to the first support-side stopper portion) of the support-side link member 4A against a tip claw part 51A (which corresponds to the first valve-side stopper portion) of the valve-side link member 5A. The second stopper mechanism is configured to limit the link angle by abutment of a lower edge part 42A (which corresponds to the second support-side stopper portion) of the support-side link member 4A against a coupling part 52A (which corresponds to the second valve-side stopper portion) of the valve-side link member 5A.

The top surface 41A and the lower edge part 42A are designed to abut against the valve-side link member 5A in a state that allows expansion and contraction of the valve-side link member 5A due to heat expansion. Similarly, the tip claw part 51A and the coupling part 52A are designed to abut against the support-side link member 4A in a state that allows expansion and contraction of the support-side link member 4A due to heat expansion.

Moreover, the lower edge part 42A is provided at a position at which, when a center position of a rotational movement of the valve-side link member 5A with respect to the support-side link member 4A varies, the lower edge part 42A restricts the rotational movement of the valve-side link member 5A in a direction of increasing the link angle, in which the rotational movement is performed about an abutment point of the top surface 41A and the tip claw part 51A, serving as a fulcrum. In other words, the tip claw part 51A is provided at a position at which, when a center position of a rotational movement of the support-side link member 4A with respect to the valve-side link member 5A varies, the tip claw part 51A restricts the rotational movement of the support-side link member 4A in a direction of increasing the link angle, in which the rotational movement is performed about the abutment point of the lower edge part 42A and the coupling part 52A, serving as a fulcrum.

Figure 7A:
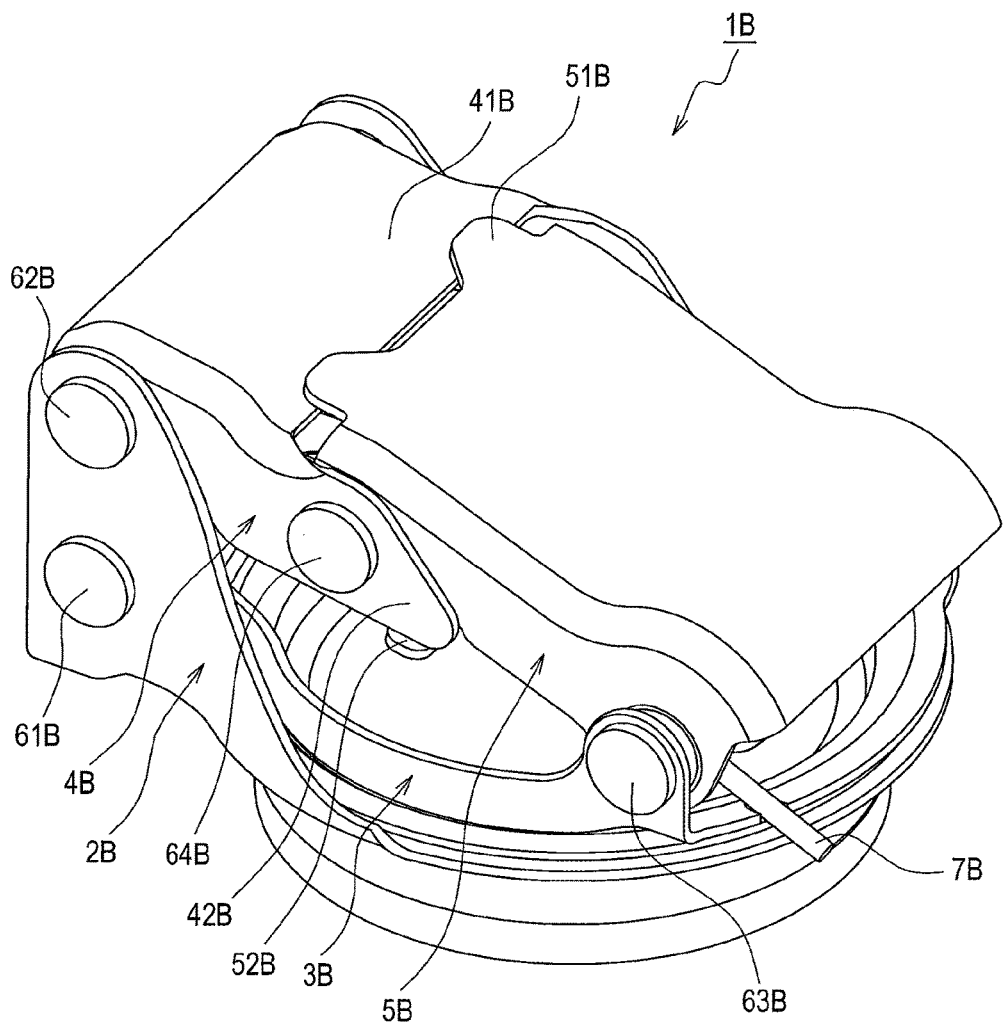
FIG. 7A is a perspective view of a valve device for an exhaust flow passage in a second modified example.
Figure 7B:
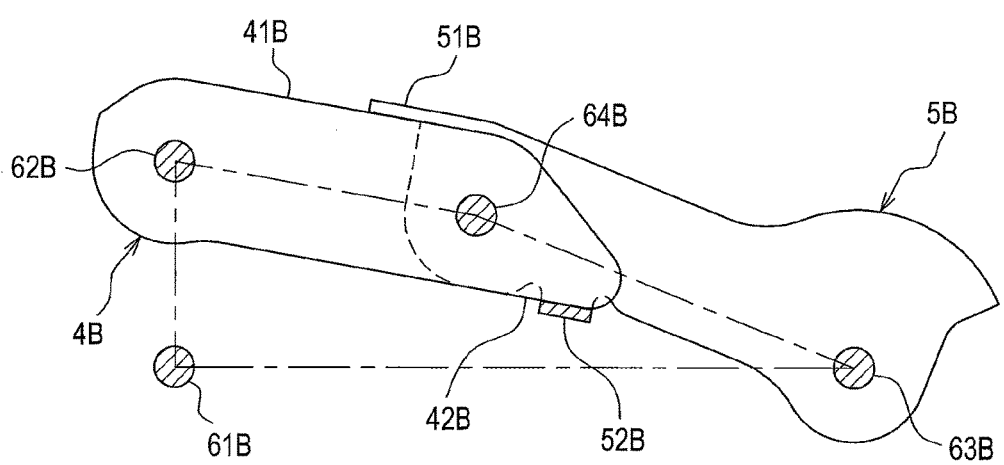
FIG. 7B is a schematic cross-sectional view showing a coupled state of a support-side link member and a valve-side link member in the second modified example.

Furthermore, for example, a valve device 1B of a second modified example shown in FIGS. 7A and 7B comprises a support body 2B and a valve body 3B as in the aforementioned embodiment, and also comprises a support-side link member 4B and a valve-side link member 5B, each of which has a greatly different shape from that in the aforementioned embodiment. In addition, the valve device 1B comprises four rotation axis members 61B to 64B, and a biasing member 7B, as in the aforementioned embodiment.

Also in the valve device 1B, as in the aforementioned embodiment, the support-side link member 4B and the valve-side link member 5B form two stopper mechanisms. The first stopper mechanism is configured to limit the link angle by abutment of a top surface 41B (which corresponds to the first support-side stopper portion) of the support-side link member 4B against a tip claw part 51B (which corresponds to the first valve-side stopper portion) of the valve-side link member 5B. The second stopper mechanism is configured to limit the link angle by abutment of the lower edge part 42B (which corresponds to the second support-side stopper portion) of the support-side link member 4B against a coupling part 52B (which corresponds to the second valve-side stopper portion) of the valve-side link member 5B.

The top surface 41B and the lower edge part 42B are designed to abut against the valve-side link member 5B in a state that allows expansion and contraction of the valve-side link member 5B due to heat expansion. Similarly, the tip claw part 51B and the coupling part 52B are designed to abut against the support-side link member 4B in a state that allows expansion and contraction of the support-side link member 4B due to heat expansion.

Moreover, the lower edge part 42B is provided at a position at which, when a center position of a rotational movement of the valve-side link member 5B with respect to the support-side link member 4B varies, the lower edge part 42B restricts the rotational movement of the valve-side link member 5B in a direction of increasing the link angle, in which the rotational movement is performed about an abutment point of the top surface 41B and the tip claw part 51B, serving as a fulcrum. In other words, the tip claw part 51B is provided at a position at which, when a center position of a rotational movement of the support-side link member 4B with respect to the valve-side link member 5B varies, the tip claw part 51B restricts the rotational movement of the support-side link member 4B in a direction of increasing the link angle, in which the rotational movement is performed about the abutment point of the lower edge part 42B and the coupling part 52B, serving as a fulcrum.

Moreover, there may be provided more than three stopper mechanisms.

[3B] In the aforementioned embodiment, illustrated is a configuration in which the biasing member 7, into which the third rotation axis member 63 has been inserted, is mounted so as to act on the valve body 3 and the valve-side link member 5; however, it should not be limited to this configuration. For example, it may be configured such that the biasing member 7, into which the fourth rotation axis member 64 has been inserted, is mounted so as to act on the support-side link member 4 and the valve-side link member 5. Furthermore, for example, it may be configured such that the biasing member 7, into which the second rotation axis member 62 has been inserted, is mounted so as to act on the support body 2 and the support-side link member 4.

[3C] In the aforementioned embodiment, the valve device 1 that opens and closes the opening of the downstream-side end portion of the inner pipe inside the muffler has been illustrated; however, the attachment position of the valve device 1 is not limited to this embodiment.

[3D] Functions that one constituent element in the aforementioned embodiment has may be divided among a plurality of constituent elements, or functions that a plurality of constituent elements have may be integrated to one constituent element. Moreover, at least part of the configuration of the aforementioned embodiment may be replaced with a known configuration having the same function. Furthermore, a part of the configuration in the aforementioned embodiment may be omitted as long as the problem can be solved. Moreover, at least part of the configuration in the aforementioned embodiment may be added to, replaced with, etc. a configuration in the aforementioned other embodiments. Note that various modes that can be included in a technical idea specified by the languages of the claims are the embodiments of the present invention.

The invention claimed is:

1. A valve device for an exhaust flow passage, the valve device comprising a toggle mechanism, the valve device comprising:
    a support body;
    a valve body that is supported by the support body so as to be rotationally movable and that is configured to open and close an exhaust flow passage;
    a support-side link member that is supported by the support body so as to be rotationally movable;
    a valve-side link member that is supported by the valve body so as to be rotationally movable and that is coupled to the support-side link member so as to be rotationally movable to each other; and
    a spring that is configured to bias the valve body in a valve closed direction,
    wherein the support-side link member and the valve-side link member form a first stopper mechanism and a second stopper mechanism,
    the first stopper mechanism being configured to limit a link angle formed by the support-side link member and the valve-side link member, by abutment of a first support-side stopper portion formed in the support-side link member and a first valve-side stopper portion formed in the valve-side link member against each other, and,
    the second stopper mechanism being configured to limit the link angle by abutment of a second support-side stopper portion formed in the support-side link member and a second valve-side stopper portion formed in the valve-side link member against each other.

2. The valve device for an exhaust flow passage according to claim 1,
    wherein the second support-side stopper portion is provided at a position at which the second support-side stopper portion restricts a rotational movement of the valve-side link member, the rotational movement being performed about an abutment point of the first support-side stopper portion and the first valve-side stopper portion, the abutment point serving as a fulcrum, and the rotational movement being performed in a direction of increasing the link angle.

3. The valve device for an exhaust flow passage according to claim 1,
    wherein the first support-side stopper portion and the second support-side stopper portion abut against the valve-side link member in a state that allows expansion and contraction of the valve-side link member due to heat expansion, and
    wherein the first valve-side stopper portion and the second valve-side stopper portion abut against the support-side link member in a state that allows extraction and contraction of the support-side link member due to heat expansion.

* * * * *